March 18, 1952  K. J. BRAUN ET AL  2,589,987
SENSING MECHANISM
Filed Sept. 15, 1950
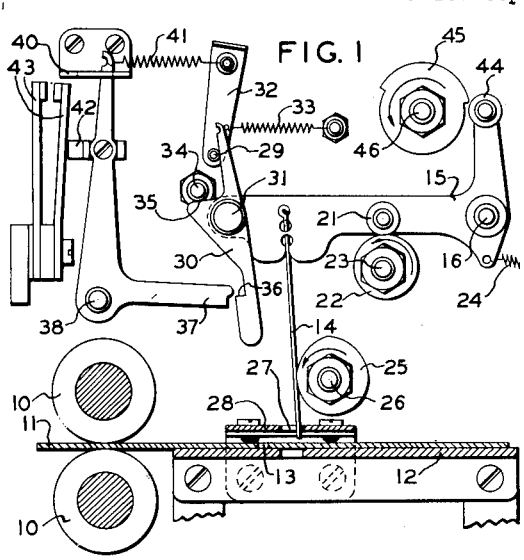
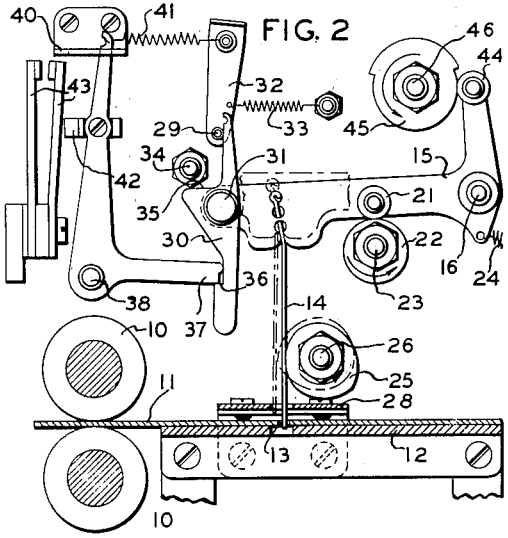
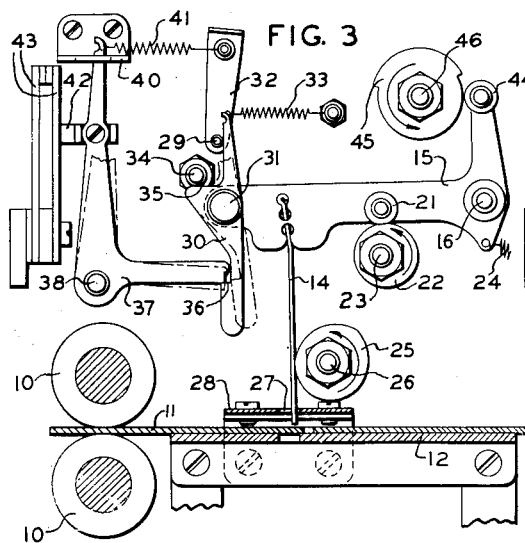
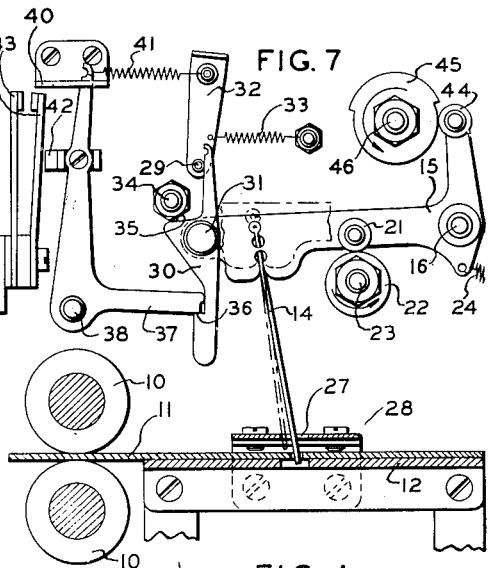
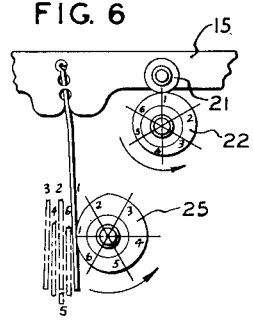
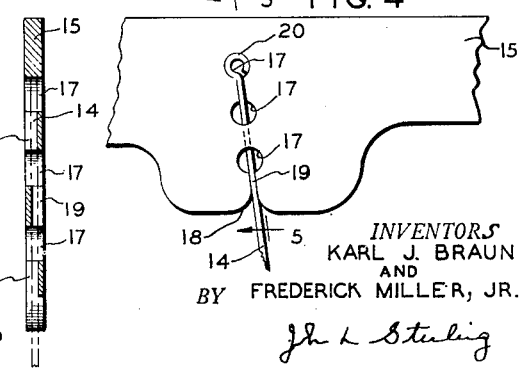
*INVENTORS*
KARL J. BRAUN
AND
BY FREDERICK MILLER, JR.
ATTORNEY Patented Mar. 18, 1952

2,589,987

UNITED STATES PATENT OFFICE 2,589,987

SENSING MECHANISM

Karl J. Braun, Glenbrook, and Frederick Miller, Jr., Springdale, Conn., assignors to Remington Rand Inc., New York, N. Y., a corporation of Delaware Application September 15, 1950, Serial No. 184,916

19 Claims. (Cl. 235—61.11)

1

This invention relates to mechanisms for sensing perforations in record cards, and more particularly to mechanisms for sensing such perforations while the record cards are being advanced by the card feeding means of an accounting or statistical machine.

The principal object of the invention is to provide an improved sensing mechanism, whereby sensing a perforation in a card being fed at a high rate of speed effects a positive mechanical impulse for controlling machine operations.

Another object of the invention is to so construct and arrange said mechanism that the sensing element does not mutilate or mar the cards or the configuration of the perforations therein.

Still another object of the invention is to provide for disabling the sensing element during predetermined periods in the operation of the machine.

A modified form of the invention has for its object to adapt the preferred form of the mechanism to those accounting and statistical machines wherein the record cards are sensed while in fixed positions.

Other objects and structural details of the invention will be apparent from the following description when read in connection with the accompanying drawing, wherein Fig. 1 is a view of the improved sensing mechanism with the several parts thereof in their normal or non-sensing positions;

Fig. 2 is a positional view of the mechanism and shows, in full lines, the positions of the several parts on the entry of the sensing element into a perforation in a card, and in outline, an intermediate position of the parts;

Fig. 3 is another positional view of the mechanism and illustrates, in full lines, the actuated position of the impulse sending means, and in outline, an intermediate position of said impulse sending means, such intermediate position being one between that shown in full lines in this figure and that shown in Fig. 1;

Fig. 4 is an enlarged fragmentary detail view illustrating the manner in which the sensing element is mounted;

Fig. 5 is an enlarged sectional view on line 5—5 of Fig. 4 with the sensing element shown in outline; Fig. 6 is a diagrammatic view illustrating the movements of the sensing element; and Fig. 7 is a view similar to Fig. 1 illustrating a modified form of the mechanism.

Referring to Figs. 1, 2, and 3 the record card feeding mechanism is illustrated diagrammatically by a pair of feed rollers 10 which advances record cards, such as that indicated at 11, toward the right with a continuous movement across a supporting plate 12. Each card 11 is the well known type of statistical record card in which perforations 13 are arranged in rows and columns according to the data that they represent. For each column of perforation positions there is provided a sensing element 14 which consists of a short stiff wire depending from the horizontal arm of a bell-crank 15 pivoted at 16 to any suitable part of the mechanism structure.

The manner in which the wire 14 is secured to the bell-crank 15 is best illustrated in Figs. 4 and 5. Three holes 17 are provided in the horizontal arm of the bell-crank on a downwardly extending line inclined from the vertical in the direction of feed of the card 11. Extending between the obliquely disposed holes 17, and also between the lowermost hole and an arcuately edged indenture 18 in the under edge of the bell-crank, are grooves 19 of which alternate ones are located in opposite sides of the bell-crank. The depths of said grooves are such that the wire 14 extends through all of them and through the holes 17 in a straight line. Within the uppermost hole 17 the end of the wire is looped as indicated at 20 rigidly securing the wire to the bell-crank. Due to the inclination of the holes 17 and the grooves 19 the wire 14 does not project straight downward, but rather, as shown in Fig. 1, is obliquely disposed in the direction of the feed of card 11. The purpose of the arcuately edged indenture 18 is to prevent kinking of wire 14 as the lower end of the latter is swung leftward from its normal position, as will be described hereinafter.

Between the wire 14 and the pivot 16, the horizontal arm of bell-crank 15 carries a follower roller 21 pressed downward by a spring 24 against the periphery of an eccentric 22 on a shaft 23. It will be seen that, as the eccentric rotates, the wire 14 will be reciprocated up and down to sense the card 11.

It is desired that the up and down reciprocatory movements of the wire 14 be correlated with the fore and aft (left and right in the drawing) reciprocations thereof in order to permit sensing cards that are in motion, that is to say, it is desired that the lower end of the wire on descending into a perforation in a card, be advanced with the card until raised free of the said perforation.

To this end the wire 14 engages the periphery of a cam 25 on a shaft 26, such engagement being maintained by the inherent tension of the wire caused by the deflection thereof from its oblique position by contact with the cams. To prevent lateral displacement of the wire, the lower end thereof passes through a guide slot 27 in a plate 28 located a short distance above the path of travel of card 11.

The eccentric 22 and the cam 25 are driven at the same speed, which speed is so coordinated with the rate of advance of card 11, as to effect sensing of each perforation position in a card column by a sweeping action of the wire 14. The cam 25 is shaped, as in the uppermost or normal position of the wire 14 shown in Fig. 1, to allow said wire to engage the rightward end of the guide slot 27. As the eccentric 22 rotates and allows the wire 14 to move downward however, the cam 25 swings the lower end of the wire 14 to the left, and, as shown in dot dash lines in Fig. 2, the said wire is in the leftward end of the slot 27 at the time when the lower end thereof is about to enter a perforation in the card. It will be noted, that in moving to the leftward end of slot 27 the wire swings past the vertical. The full line position of Fig. 2 illustrates the parts in the positions they assume when wire 14 is in its lowermost position and the lower end thereof is fully engaged in the perforation in the card. As shown, the rotation of cam 25 has allowed the lower end of the wire 14 to swing rightward with the advancing card to a substantially vertical position wherein the wire is located in substantially the center of the guide slot 27. As the eccentric 20 raises wire 14 to free it from the perforation in the card, cam 25 allows the lower end of said wire to advance further rightward with the card until, as shown in Fig. 3, the wire is free of the card, and is again located in the rightward end of guide slot 27.

The movements of the wire 14 are illustrated diagrammatically in Fig. 6. In this figure, six positions of eccentric 22 and cam 25 are indicated by the numerals one to six, and the corresponding six positions of the wire 14 are shown designated each by the appropriate numeral one to six.

It will be seen that the number one position of wire 14 is the uppermost or normal one illustrated in Fig. 1. As the wire moves from initial position to its second and third positions the leftward displacement thereof by cam 25 offsets the lowering thereof by eccentric 22 so that in the number three position the lower end of the wire is in the same horizontal plane as in the number one position. In moving from the number three to the number four position however, the lower end of the wire travels in the same direction as the card and moves downward to a point just clearing the card. In going from the number 4 to the number 5 position, the wire travels along with the card and descends into the perforation 13. In the number six position the lower end of the wire is in the same horizontal plane as in the number four position, that is, just clear of the card, but has advanced with the card in reaching such position. From the number six position the wire returns to its number one position.

The construction is such that the lower end of the wire while advancing at the same rate as a moving card, is lowered into a perforation in the card and travels along with the card until such time as it is lifted clear of the perforation. This results in that the wire does not contact the edges of the perforation and the latter is not mutilated in any way.

In those instances wherein wire 14 descends on an imperforate portion of the card 11, engagement thereof with the surface of the card prevents further rocking of the bell-crank 15. Due, however, to the action of cam 25 the wire does not scrape across the surface of the card but rather advances with the card until lifted clear thereof by the eccentric 22.

It is desired that a positive mechanical impulse be provided on sensing a perforation in a card. To this end, referring to Fig. 1, a substantially vertical lever 30 is pivoted at 31 to the free end of the horizontal arm of bell-crank 15. Lever 30 is tensioned clockwise by a spring 33 which acts on the upper arm of the lever through a stud 29 projecting from a pivoted arm 32 engaged by said spring. In the normal position of the parts shown in Fig. 1, clockwise movement of lever 30 by spring 33 is prevented by a stud 34 against which a shoulder 35 of the lever limits. The depending arm of the lever 30 is notched to provide a hooking shoulder 36 adapted to engage beneath the free end of the horizontal arm of a bell-crank 37 pivoted at 38. The vertical arm of bell-crank 37 passes through a guide slot in a bracket 40 and is engaged by a spring 41 which tensions the bell-crank clockwise. The clockwise movement of said bell-crank 27 is limited by the engagement of the upstanding arm thereof in the end of the slot in bracket 40. A suitable pusher 42 is secured in any suitable manner to the upstanding arm of bell-crank 37, and has for its purpose to transmit the aforementioned positive mechanical impulse to the machine mechanism to be controlled thereby. In the illustrated instance of the invention the controlled mechanism is indicated by a pair of normally opened electrical contacts 43 adapted to be closed by said pusher 42. However, any other impulse operated mechanism could be substituted for said contacts.

The operation is as follows:

The normal position of the parts is shown in Fig. 1. On sensing a perforation in the card, wire 14 and lever 30 descend to their lowest positions as shown in Fig. 2, such downward movement of the lever 30 allowing the spring 33 to rock hooking shoulder 36 into engagement with the horizontal arm of the bell-crank 37. Upward restoration of lever 30 by eccentric 22 positively rocks the bell-crank 37, and the pusher 42 closes the contacts 43 as shown in full lines in Fig. 3. The stud 34 is so situated with respect to the shoulder 35 of lever 30 that said shoulder engages the stud before the lever has reached its uppermost position and rocks hooking shoulder 36 out of engagement with the bell-crank 37 which is restored to normal position by spring 41. This is illustrated in dot dash lines in Fig. 3. When the highest point of eccentric 22 engages the roller 21 the entire device is normalized and another cycle of operation begins.

In those instances wherein a wire 14 descends on an imperforate portion of the card, the lever 30 does not descend far enough for hooking shoulder 36 to engage beneath the horizontal arm of bell-crank 37. Therefore, when the said lever is lifted by the eccentric 22 its hooking shoulder does not affect said bell-crank.

It will be seen, therefore, that there has been provided a sensing mechanism adapted to sense perforated cards while the latter are in motion, which mechanism because of the related timing of the cam 25, the eccentric 22 and the feed rollers 10 is operable at any desired speed to transmit a positive mechanical impulse to the mechanism controlled thereby.

It is desired that the sensing mechanism be disabled during those periods of machine operation in which no card is in position to be sensed. For example, it is not desired that sensing occur when one card has been fed past the sensing wire 14 and the next following card has not yet reached the wire. To this end the upstanding arm of bell-crank 15 carries a roller 44 adapted to engage a cam 45 on a shaft 46. Cam 45 is provided with two concentric dwells, namely, a low dwell so designed as to permit of the bell-crank 15 following the eccentric 22 as described above, and a high dwell designed to hold the bell-crank in normal position and prevent it from following the eccentric.

The effective angular lengths of the low and high dwells of cam 45 are proportionate, respectively, to the linear distances between the first and last sensed perforation positions in a card, and between the last sensed perforation position in one card and the first position to be sensed in the next following card. The cam 45 is rotated at a rate of speed so proportioned relative to that of cam 25 and eccentric 22 that during the period in which the low dwell of cam 45 engages its roller 44, cam 25 and eccentric 22 complete one rotation for each perforation position in a card column. Thus, the sensing wire 14 is operated only to sense those portions of the card in which a perforation may occur.

In some card controlled machines the record cards are not fed through the sensing mechanism with a continuous motion but are stopped in each of a plurality of fixed positions in which one of the perforation positions in a card column is located in position to be sensed. As shown in Fig. 7 the mechanism of the invention, by a simple modification is also adapted to this type of machine. The modification consists in eliminating the cam 25. In all other respects the mechanism remains unchanged. In this form of the invention the wire 14 is reciprocated up and down by the eccentric 22 and if a perforation is sensed it effects an operation of the bell-crank 37 the same as described above.

It will be evident that, due to the coordinated action of the cam 25 and eccentric 22, the wire 14 is given a sweeping motion that coincides with the travel of the card.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What we claim as new, and desire to secure by Letters Patent is:

1. A device for sensing perforations in a record card being fed past the device with a continuous movement, which comprises a stiff wire extending toward the path of the card, means for reciprocating the wire into and out of perforations in the card, and means acting on the wire to flex the same and impart thereto an advance movement with the card while the wire is engaged in a perforation therein.

2. A device for sensing perforations in a record card being fed past the device with a continuous movement, which comprises a stiff wire extending toward the path of the card, means for reciprocating the wire into and out of perforations in the card, and a cam engaging said wire to move the latter in a direction opposite to that of the feed of the card before the wire enters a perforation, and to permit said wire to advance with the perforation while engaged therein.

3. A device for sensing perforations in a record card being fed past the device with a continuous movement, which comprises a stiff wire extending toward the path of the card, a pivoted member to which said wire is secured, an eccentric engaging said pivoted member to reciprocate said wire into and out of perforations in the card, and a cam driven at the same speed as said eccentric and engaging said wire to move the latter in a direction opposite to the feed of the card before the latter enters a perforation and to allow the wire to advance with the perforation while engaged therein.

4. A device for sensing perforations arranged in a column in a record card being fed past the device with a continuous movement, which comprises a stiff wire extending toward the path of the card, a pivoted member to which said wire is secured, an eccentric engaging said pivoted member and timed to reciprocate said wire into and out of each perforation in said column, and a cam driven at the same speed as said eccentric and engaging said wire to move the latter in the opposite direction to the card before the wire enters each perforation, and to allow said wire to advance with each perforation while engaged therein.

5. A device for sensing perforations arranged in definite positions in a column of a record card being fed past the device with a continuous movement, which comprises a stiff wire extending toward the path of the card, a pivoted member to which said wire is secured, an eccentric engaging said member and timed to move the wire into contact with each imperforate perforation position in a column and into each perforation, and a cam driven at the same speed as the eccentric and engaging said wire to move the same in the opposite direction to the card before the wire contacts each imperforate perforation position or enters into a perforation, and to allow the wire to advance with the card while the same is contacting said card or is engaged in a perforation.

6. A device for sensing perforations arranged in a column in a record card being fed past the device with a continuous movement, which comprises a stiff wire extending toward the path of the card, a pivoted member to which said wire is secured, an eccentric engaging said pivoted member and timed to reciprocate said wire into and out of each perforation in said column, a cam driven at the same speed as said eccentric and engaging said wire to move the latter in the opposite direction to the card before the wire enters each perforation, and to allow said wire to advance with each perforation while engaged therein; an actuating lever pivoted to said member, an impulse transmitting member engaged by said actuating lever when the wire is moved into a perforation and actuated by said lever as the wire is moved out of the perforation, and a trip to disengage said lever from said transmitting member after the wire is moved out of the perforation.

7. A device for sensing perforations in a record card being fed past the device with a continuous movement, which comprises a stiff wire extending toward the path of the card, a pivoted member to which said wire is secured, an eccentric engaging said pivoted member to reciprocate said wire into and out of perforations in the card, a cam driven at the same speed as said eccentric and engaging said wire to move the latter in a direction opposite to the feed of the card before the latter enters a perforation and to allow the wire to advance with the perforation while engaged therein; an actuating lever pivoted to said member, an impulse transmitting member engaged by said actuating lever when the wire is moved into a perforation and actuated by said lever as the wire is moved out of the perforation, and a trip to disengage said lever from said transmitting member after the wire is moved out of the perforation.

8. A device for sensing perforations in a record card being fed past the device with a continuous movement, which comprises a stiff wire extending toward the path of the card, means for reciprocating the wire into and out of perforations in the card, a cam engaging said wire to move the latter in a direction opposite to that of the feed of the card before the wire enters a perforation, and to permit said wire to advance with the perforation while engaged therein, an actuating lever pivoted to said member, an impulse transmitting member engaged by said actuating lever when the wire is moved into a perforation, and actuated by said lever as the wire is moved out of the perforation, and a trip to disengage said lever from said transmitting member after the wire is moved out of the perforation.

9. A device for sensing perforations arranged in definite positions in a column of a record card being fed past the device with a continuous movement, which comprises a stiff wire extending toward the path of the card, a pivoted member to which said wire is secured, an eccentric engaging said member and timed to move the wire into contact with each imperforate perforation position in a column and into each perforation, a cam driven at the same speed as the eccentric and engaging said wire to move the same in the opposite direction to the card before the wire contacts each imperforate perforation position or enters into a perforation, and to advance the wire with the card while the same is contacting said card or is engaged in a perforation, an actuating lever pivoted to said member, an impulse transmitting member engaged by said actuating lever when the wire is moved into a perforation and actuated by said lever as the wire is moved out of the perforation, and a trip to disengage said lever from said transmitting member after the wire is moved out of the perforation.

10. A device for sensing perforations in record cards being fed past the device with a continuous movement, which comprises a stiff wire extending toward the path of the cards, means for reciprocating the wire into and out of perforations in the cards, a cam engaging said wire to move the latter in a direction opposite to that of the feed of the cards before the wire enters a perforation, and to permit said wire to advance with the perforation while engaged therein, and a cam engaging said pivoted member to disable said wire when a card has passed thereby and the next card has not arrived in position for sensing.

11. A device for sensing perforations arranged in a column in each of a plurality of record cards being fed past the device with a continuous movement, which comprises a stiff wire extending toward the path of the cards, a pivoted member to which said wire is secured, an eccentric engaging said pivoted member and timed to reciprocate said wire into and out of each perforation in a said column, a cam driven at the same speed as said eccentric and engaging said wire to move the latter in the opposite direction to the cards before the wire enters each perforation and to allow said wire to advance with each perforation while engaged therein, and a cam engaging said pivoted member to disable said wire when a card has passed thereby and the next card has not arrived in position for sensing.

12. A device for sensing perforations arranged in definite positions in a column of each of a plurality of record cards being fed past the device with a continuous movement, which comprises a stiff wire extending toward the path of the cards, a pivoted member to which said wire is secured, an eccentric engaging said member and timed to move the wire into contact with each imperforate perforation position in a column and into each perforation, a cam driven at the same speed as the eccentric and engaging said wire to move the same in the opposite direction to the card before the wire contacts each imperforate perforation position or enters into a perforation and to allow the wire to advance with the card while the same is contacting said card or is engaged in a perforation, and a cam engaging said pivoted member to disable said wire when the last sensed perforation position in one card has been fed past the latter and until the first perforation position in the next succeeding card has reached sensing position.

13. A device for sensing perforations in record cards being fed past the device with a continuous movement, which comprises a stiff wire extending toward the path of the card, means for reciprocating the wire into and out of perforations in the card, a cam engaging said wire to move the latter in a direction opposite to that of the feed of the card before the wire enters a perforation and to permit said wire to advance with the perforation while engaged therein, an actuating lever pivoted to said member, an impulse transmitting member engaged by said actuating lever when the wire is moved into a perforation and actuated by said lever as the wire is moved out of the perforation, a trip to disengage said lever from said transmitting member after the wire is moved out of the perforation, and a cam engaging said pivoted member to disable said wire when a card has passed thereby and the next card has not arrived in position for sensing.

14. A device for sensing perforations arranged in a column in each of a plurality of record cards being fed past the device with a continuous movement, which comprises a stiff wire extending toward the path of the cards, a pivoted member to which said wire is secured, an eccentric engaging said pivoted member and timed to reciprocate said wire into and out of each perforation in said column, a cam driven at the same speed as said eccentric and engaging said wire to move the latter in the opposite direction to the card before the wire enters each perforation and to allow said wire to advance with each perforation while engaged therein, an actuating lever pivoted to said member, an impulse transmitting member engaged by said actuating lever when the wire is moved into a perforation and actuated by said lever as the wire is moved out of the perforation, a trip to disengage said lever from said transmitting member after the wire is moved out of the perforation, and a cam engaging said pivoted member to disable said wire when a card has passed thereby and the next card has not arrived in position for sensing.

15. A device for sensing perforations arranged in definite positions in a column of each of a plurality of record cards being fed past the device with a continuous movement, which comprises a stiff wire extending toward the path of the cards, a pivoted member to which said wire is secured, an eccentric engaging said member and timed to move the wire into contact with each imperforate perforation position in a column and into each perforation, a cam driven at the same speed as the eccentric and engaging said wire to move the same in the opposite direction to the card before the wire contacts each imperforate perforation position or enters into a perforation and to allow the wire to advance with the card while the same is contacting said card or is engaged in a perforation, an actuating lever pivoted to said member, an impulse transmitting member engaged by said actuating lever when the wire is moved into a perforation and actuated by said lever as the wire is moved out of the perforation, a trip to disengage said lever from said transmitting member after the wire is moved out of the perforation, and a cam engaging said pivoted member to disable said wire when the last sensed perforation position in one card has been fed past the latter and until the first perforation in the next succeeding card has reached sensing position.

16. A device for sensing perforations arranged in definite positions in a column of a record card being fed past the device with a continuous movement, which comprises a stiff wire extending toward the path of the card, a pivoted member to which said wire is secured, an eccentric engaging said member and timed to move the wire into contact with each imperforate perforation position in a column and into each perforation, an actuating lever pivoted to said member, an impulse transmitting member engaged by said actuating lever when the wire is moved into a perforation and actuated by said lever as the wire is moved out of the perforation, and a trip to disengage said lever from said transmitting member after the wire is moved out of the perforation.

17. A device for sensing perforations arranged in definite positions in a column of each of a plurality of record cards being fed past the device with a continuous movement, which comprises a stiff wire extending toward the path of the cards, a pivoted member to which said wire is secured, an eccentric engaging said member and timed to move the wire into contact with each imperforate perforation position in a column and into each perforation, an actuating lever pivoted to said member, an impulse transmitting member engaged by said actuating lever when the wire is moved into a perforation and actuated by said lever as the wire is moved out of the perforation, a trip to disengage said lever from said transmitting member after the wire is moved out of the perforation, and a cam engaging said pivoted member to disable said wire when the last sensed perforation position in one card has been fed past the latter and until the first perforation in the next succeeding card has reached sensing position.

18. A device for sensing perforations in a record card being fed past the device, which comprises a stiff wire, means for reciprocating the wire toward and away from the card, and means for flexing the wire in a direction coinciding with the path of the card during reciprocation thereof to cause the card engaging end of the wire to move in one direction with the card.

19. A device for sensing perforations in a record card being fed past the device, which comprises a stiff wire, means for reciprocating the wire toward and away from the card, means for flexing the wire in a direction coinciding with the path of the card during reciprocation thereof to cause the card engaging end of the wire to move in one direction with the card, and impulse transmitting means operable by said reciprocating means when the wire senses a perforation in the card.

KARL J. BRAUN.
FREDERICK MILLER, JR.

REFERENCES CITED

The following references are of record in the file of this patent:

UNITED STATES PATENTS

| Number | Name | Date |
|---|---|---|
| 1,745,388 | Tauschek | Feb. 4, 1930 |
| 2,310,544 | Randolph | Feb. 9, 1943 |
| 2,395,557 | Leathers | Feb. 26, 1946 |